US010915598B2

(12) United States Patent
Shingala et al.

(10) Patent No.: US 10,915,598 B2
(45) Date of Patent: Feb. 9, 2021

(54) GENERATING HTML CONTENT TO CACHE BASED ON A MEMBER IDENTIFIER AND A TEMPLATE WHEN THERE IS NO CACHED HTML CONTENT ASSOCIATED WITH A CAMPAIGN AND SERVING THE CACHED HTML CONTENT

(71) Applicant: Microsoft Technology Licensing, LLC, Redmond, WA (US)

(72) Inventors: Nirav Nalinbhai Shingala, Santa Clara, CA (US); Lance Dibble, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 92 days.

(21) Appl. No.: 16/370,593

(22) Filed: Mar. 29, 2019

(65) Prior Publication Data

US 2020/0311174 A1  Oct. 1, 2020

(51) Int. Cl.
*G06F 16/957* (2019.01)
*G06F 16/955* (2019.01)
*H04L 29/06* (2006.01)
*H04L 12/927* (2013.01)
*G06Q 30/02* (2012.01)

(52) U.S. Cl.
CPC ...... *G06F 16/9577* (2019.01); *G06F 16/9566* (2019.01); *G06Q 30/0277* (2013.01); *H04L 47/801* (2013.01); *H04L 63/1425* (2013.01)

(58) Field of Classification Search
CPC ............. G06F 16/9577; G06F 16/9566; H04L 63/1425; H04L 47/801; G06Q 30/0277
See application file for complete search history.

(56) References Cited

U.S. PATENT DOCUMENTS

| 5,933,811 A  * | 8/1999 | Angles ................... G06Q 30/02 705/14.56 |
| 6,173,317 B1 * | 1/2001 | Chaddha ................. H04L 29/06 709/219 |
| 6,240,555 B1 * | 5/2001 | Shoff .................. H04N 5/44591 725/110 |
| 6,772,209 B1 * | 8/2004 | Chernock ......... H04L 29/06027 709/225 |

(Continued)

*Primary Examiner* — Daniel C. Murray
(74) *Attorney, Agent, or Firm* — Hickman Palermo Becker Bingham LLP

(57) ABSTRACT

Techniques of content delivery for HTML content based on a predefined template generated at a content serving service are provided. A request for HTML content is received and a member ID that matches the request is determined to identify a set of campaigns. For each identified campaign, a cache is read to identify respective HTML content. Upon determining that one of the campaigns has corresponding HTML content stored in the cache and that was already generated at the content serving service, a URL is generated based on the request. The HTML content and the URL are sent to a client device. For a campaign that does not have stored HTML content, HTML content for that campaign is generated using a template with a predefined format and content that is specific to the campaign. The template has formatting parameters for the content. The generated HTML content is stored in the cache.

20 Claims, 7 Drawing Sheets

(56) References Cited

U.S. PATENT DOCUMENTS

| | | | | |
|---|---|---|---|---|
| 7,620,903 | B1* | 11/2009 | Rasmussen | G06F 9/451 715/762 |
| 8,464,151 | B2* | 6/2013 | Miyazawa | G06F 40/174 715/271 |
| 8,660,951 | B2* | 2/2014 | Calman | G07F 17/16 705/41 |
| 8,682,721 | B1* | 3/2014 | Kent | G06Q 30/08 705/14.43 |
| 8,863,178 | B1* | 10/2014 | Abou-Rizk | H04N 21/25841 725/35 |
| 8,868,639 | B2* | 10/2014 | Raleigh | H04L 67/306 709/202 |
| 8,874,792 | B2* | 10/2014 | Sanghavi | H04L 67/20 709/246 |
| 8,924,516 | B2* | 12/2014 | Sanghavi | G06Q 30/0241 709/219 |
| 8,954,843 | B2* | 2/2015 | Morooka | G06F 40/106 715/246 |
| 9,105,033 | B2* | 8/2015 | Levine | G06Q 30/0271 |
| 9,210,217 | B2* | 12/2015 | Raleigh | H04L 67/26 |
| 9,246,990 | B2* | 1/2016 | Kirillov | H04L 67/2823 |
| 9,338,233 | B2* | 5/2016 | Raleigh | H04W 4/50 |
| 9,361,631 | B2* | 6/2016 | Meyer | G06Q 30/0256 |
| 9,367,862 | B2* | 6/2016 | Yruski | G06Q 30/02 |
| 9,390,441 | B2* | 7/2016 | Allaire | G06Q 30/0273 |
| 9,461,936 | B2* | 10/2016 | Kirillov | G06F 40/106 |
| 9,467,239 | B1* | 10/2016 | Colby | H04H 60/51 |
| 9,503,510 | B2* | 11/2016 | Raleigh | H04L 67/2847 |
| 9,734,515 | B1* | 8/2017 | Belser | G06Q 30/0267 |
| 9,830,304 | B1* | 11/2017 | Simeonov | G06F 40/103 |
| 9,864,998 | B2* | 1/2018 | Yruski | G06Q 30/02 |
| 9,990,656 | B2* | 6/2018 | Saifee | G06Q 30/0277 |
| 10,007,933 | B2* | 6/2018 | Simeonov | G06F 40/131 |
| 10,068,261 | B1* | 9/2018 | Barnes | G06Q 30/0277 |
| 10,319,055 | B2* | 6/2019 | Anderson | G06Q 30/0273 |
| 10,373,174 | B2* | 8/2019 | Eklund | G06Q 30/02 |
| 10,380,597 | B2* | 8/2019 | Krassner | G06Q 30/02 |
| 10,380,602 | B2* | 8/2019 | Krassner | G06Q 30/02 |
| 10,410,237 | B1* | 9/2019 | Barnes | G06Q 30/0241 |
| 10,410,248 | B2* | 9/2019 | Yruski | G06Q 30/0277 |
| 10,560,408 | B2* | 2/2020 | Sadanandan | H04L 51/10 |
| 10,600,082 | B1* | 3/2020 | Gotcher | G06Q 30/0251 |
| 10,614,153 | B2* | 4/2020 | Rimmer | G06F 40/189 |
| 10,657,538 | B2* | 5/2020 | Yruski | G06Q 30/0258 |
| 10,664,851 | B1* | 5/2020 | Barnes | H04M 15/44 |
| 10,672,040 | B1* | 6/2020 | Yolken | G06Q 30/0277 |
| 2002/0004744 | A1* | 1/2002 | Muyres | G06Q 30/0241 705/14.4 |
| 2002/0095332 | A1* | 7/2002 | Doherty | G06Q 30/0601 705/14.53 |
| 2002/0103698 | A1* | 8/2002 | Cantrell | G06Q 30/0257 705/14.55 |
| 2002/0147638 | A1* | 10/2002 | Banerjee | G06Q 30/02 705/14.53 |
| 2002/0194215 | A1* | 12/2002 | Cantrell | G06Q 30/0277 715/230 |
| 2003/0050931 | A1* | 3/2003 | Harman | G06F 16/9577 |
| 2004/0010417 | A1* | 1/2004 | Peled | G06Q 30/06 709/225 |
| 2005/0043060 | A1* | 2/2005 | Brandenberg | G06F 1/1624 455/558 |
| 2005/0187895 | A1* | 8/2005 | Paya | G06F 16/958 |
| 2006/0265657 | A1* | 11/2006 | Gilley | G11B 27/034 715/730 |
| 2007/0094082 | A1* | 4/2007 | Yruski | H04L 67/02 705/14.56 |
| 2007/0094083 | A1* | 4/2007 | Yruski | G06Q 30/0269 705/14.66 |
| 2007/0094363 | A1* | 4/2007 | Yruski | H04L 67/20 709/220 |
| 2007/0100648 | A1* | 5/2007 | Borquez | G06Q 30/02 709/218 |
| 2007/0100690 | A1* | 5/2007 | Hopkins | G06Q 30/0271 705/14.67 |
| 2007/0130012 | A1* | 6/2007 | Yruski | G06Q 30/02 705/14.68 |
| 2008/0091513 | A1* | 4/2008 | Waggoner | G06Q 10/06375 705/7.33 |
| 2008/0091535 | A1* | 4/2008 | Heiser, II | G06Q 30/0269 705/14.45 |
| 2008/0098075 | A1* | 4/2008 | O'Bryan | G06Q 30/02 709/206 |
| 2008/0126476 | A1* | 5/2008 | Nicholas | G06Q 10/10 709/203 |
| 2008/0126495 | A1* | 5/2008 | Lynn | H04L 12/1859 709/206 |
| 2008/0140524 | A1* | 6/2008 | Anand | G06Q 30/0269 705/14.66 |
| 2009/0055267 | A1* | 2/2009 | Roker | G06Q 30/0273 705/14.1 |
| 2009/0076887 | A1* | 3/2009 | Spivack | G06Q 30/0273 705/14.69 |
| 2009/0157442 | A1* | 6/2009 | Tesler | G06Q 30/0277 705/14.43 |
| 2009/0265243 | A1* | 10/2009 | Karassner | G06Q 30/02 705/14.54 |
| 2010/0049603 | A1* | 2/2010 | Peterson | G06Q 30/0264 705/14.45 |
| 2010/0106606 | A1* | 4/2010 | Filice | G06Q 30/0269 705/14.73 |
| 2010/0257022 | A1* | 10/2010 | Wang | G06Q 30/02 705/7.29 |
| 2010/0293049 | A1* | 11/2010 | Maher | G06Q 30/0273 705/14.46 |
| 2011/0106616 | A1* | 5/2011 | Bigby | G06Q 10/107 705/14.49 |
| 2011/0106622 | A1* | 5/2011 | Kuhlman | G06Q 30/0267 705/14.53 |
| 2011/0289582 | A1* | 11/2011 | Kejriwal | G06F 21/566 726/22 |
| 2012/0023046 | A1* | 1/2012 | Verma | G06Q 30/0201 706/12 |
| 2012/0041834 | A1* | 2/2012 | McRae, II | G06Q 30/08 705/26.3 |
| 2013/0036009 | A1* | 2/2013 | Heiser, II | G06Q 30/0246 705/14.53 |
| 2013/0110950 | A1* | 5/2013 | Martine | G06Q 30/02 709/206 |
| 2013/0173394 | A1* | 7/2013 | Birch | H04N 7/163 705/14.66 |
| 2014/0006931 | A1* | 1/2014 | Pettitt | G06F 16/958 715/234 |
| 2014/0114965 | A1* | 4/2014 | Balduzzi | G06F 16/24 707/723 |
| 2014/0143806 | A1* | 5/2014 | Steinberg | G11B 27/034 725/34 |
| 2014/0214529 | A1* | 7/2014 | Gross-Baser | G06Q 30/0276 705/14.45 |
| 2014/0257935 | A1* | 9/2014 | Killoh | G06Q 30/0283 705/7.35 |
| 2014/0324545 | A1* | 10/2014 | Splaine | G06Q 30/0204 705/7.33 |
| 2015/0073909 | A1* | 3/2015 | Peden | G06Q 30/0275 705/14.58 |
| 2015/0161673 | A1* | 6/2015 | Guo | G06Q 50/01 705/14.66 |
| 2015/0220990 | A1* | 8/2015 | Kobyakov | G06F 40/14 705/14.6 |
| 2015/0236979 | A1* | 8/2015 | Kirillov | G06Q 30/0277 709/226 |
| 2016/0132935 | A1* | 5/2016 | Shen | G06Q 30/0269 705/14.66 |
| 2016/0189201 | A1* | 6/2016 | Shao | G06Q 30/0243 705/14.42 |
| 2016/0343037 | A1* | 11/2016 | Nicholas | H04L 67/306 |
| 2016/0373513 | A1* | 12/2016 | Kim | G06F 16/951 |
| 2017/0024762 | A1* | 1/2017 | Swaminathan | G06Q 30/0251 |
| 2017/0061502 | A1* | 3/2017 | Zhang | G06Q 30/0275 |

(56) References Cited

U.S. PATENT DOCUMENTS

| | | | |
|---|---|---|---|
| 2017/0091811 A1* | 3/2017 | Saxena | G06Q 30/0247 |
| 2017/0103416 A1* | 4/2017 | Krishnan | G06Q 30/0254 |
| 2017/0140422 A1* | 5/2017 | Kolay | G06Q 30/0277 |
| 2017/0223137 A1* | 8/2017 | Yu | H04L 67/325 |
| 2017/0243244 A1* | 8/2017 | Trabelsi | G06Q 30/0255 |
| 2017/0316458 A1* | 11/2017 | Peretz | G06Q 30/0269 |
| 2018/0025087 A1* | 1/2018 | Kalyanaraman | G06F 16/24578 707/710 |
| 2018/0032583 A1* | 2/2018 | Koufogiannakis | G06F 16/24575 |
| 2018/0034939 A1* | 2/2018 | Boisvert | H04L 67/306 |
| 2018/0053205 A1* | 2/2018 | Qin | G06Q 30/0277 |
| 2018/0107462 A1* | 4/2018 | Wei | G06F 8/38 |
| 2018/0113842 A1* | 4/2018 | Xiao | G06F 40/103 |
| 2018/0225676 A1* | 8/2018 | Yruski | H04L 67/306 |
| 2018/0330408 A1* | 11/2018 | Bennett | G06Q 30/0277 |
| 2019/0087865 A1* | 3/2019 | Loree | G06Q 50/01 |
| 2019/0114662 A1* | 4/2019 | Bennion | G06Q 30/0277 |
| 2019/0333084 A1* | 10/2019 | Passantino | G06Q 50/01 |
| 2020/0027133 A1* | 1/2020 | Segalov | G06F 21/6263 |
| 2020/0034874 A1* | 1/2020 | Narayan | G06Q 30/0244 |
| 2020/0111069 A1* | 4/2020 | Chahal | G06Q 20/123 |
| 2020/0127957 A1* | 4/2020 | Monberg | H04L 67/20 |
| 2020/0184515 A1* | 6/2020 | deWet | G06Q 30/0254 |

\* cited by examiner

GENERATING HTML CONTENT TO CACHE BASED ON A MEMBER IDENTIFIER AND A TEMPLATE WHEN THERE IS NO CACHED HTML CONTENT ASSOCIATED WITH A CAMPAIGN AND SERVING THE CACHED HTML CONTENT

TECHNICAL FIELD

The present disclosure relates to serving electronic content and, more particularly, to optimizing rendering of hypertext markup language (HTML) content on one or more computing devices.

BACKGROUND

Many content delivery systems that publish content through third-party web applications and third-party mobile applications rely on a third-party exchange system to create requested content and deliver the requested content to a client computing device who initiated the request. For each content request, the third-party exchange system might in turn generate the requested content based on their own template and formatting parameters.

However, because the third-party exchange system generates the content, the content delivery system has limited control on the formatting process (such as generating, updating, and editing the content and the format), the rendering process (such as rendering the requested content based on the configuration of the mobile device), and the tracking process (such as tracking the user interaction statistics for improving the user experience). The inability to perform such processes may contribute to the failure in meeting the security and rendering standard of the content delivery system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques for content delivery of HTML content that is generated at a content serving service using a predefined template are provided. A request for HTML content is received and a member ID that matches the request is determined. Based on the matched member ID, a plurality of associated campaigns that is associated with the matched member ID is identified. For each of the plurality of campaigns, a cache is read to identify respective HTML content to check if the respective HTML content is already stored in the cache. Upon determining that one of the campaigns has corresponding HTML content stored in the cache, a URL is generated based on the request. The HTML content and the URL are sent to a client computing device.

For one of the campaigns that does not have corresponding HTML content stored in the cache, the content serving service accesses a content database to retrieve content that is specific to the campaign and retrieve a template that provides a predefined format for formatting the content. The content serving service generates HTML content based on the template and using the content specific to the campaign. The generated HTML content is stored in the cache.

Embodiments described herein improve the utility of electronic content delivery methods for end users by serving HTML content generated at content serving service using the formatting parameters and a predefined template. Embodiments improve the security of content data that is rendered on a client device by creating the HTML content at the content serving service using its own template, ensuring that the correctly formatted content is rendered on the client device. Embodiments described herein also improves tracking and controlling of the requested content by creating the HTML content at the content serving service using the predefined template, instead of having the third-party exchange system create the requested content using the third-party exchange system's template.

System Overview

Figure 1A:
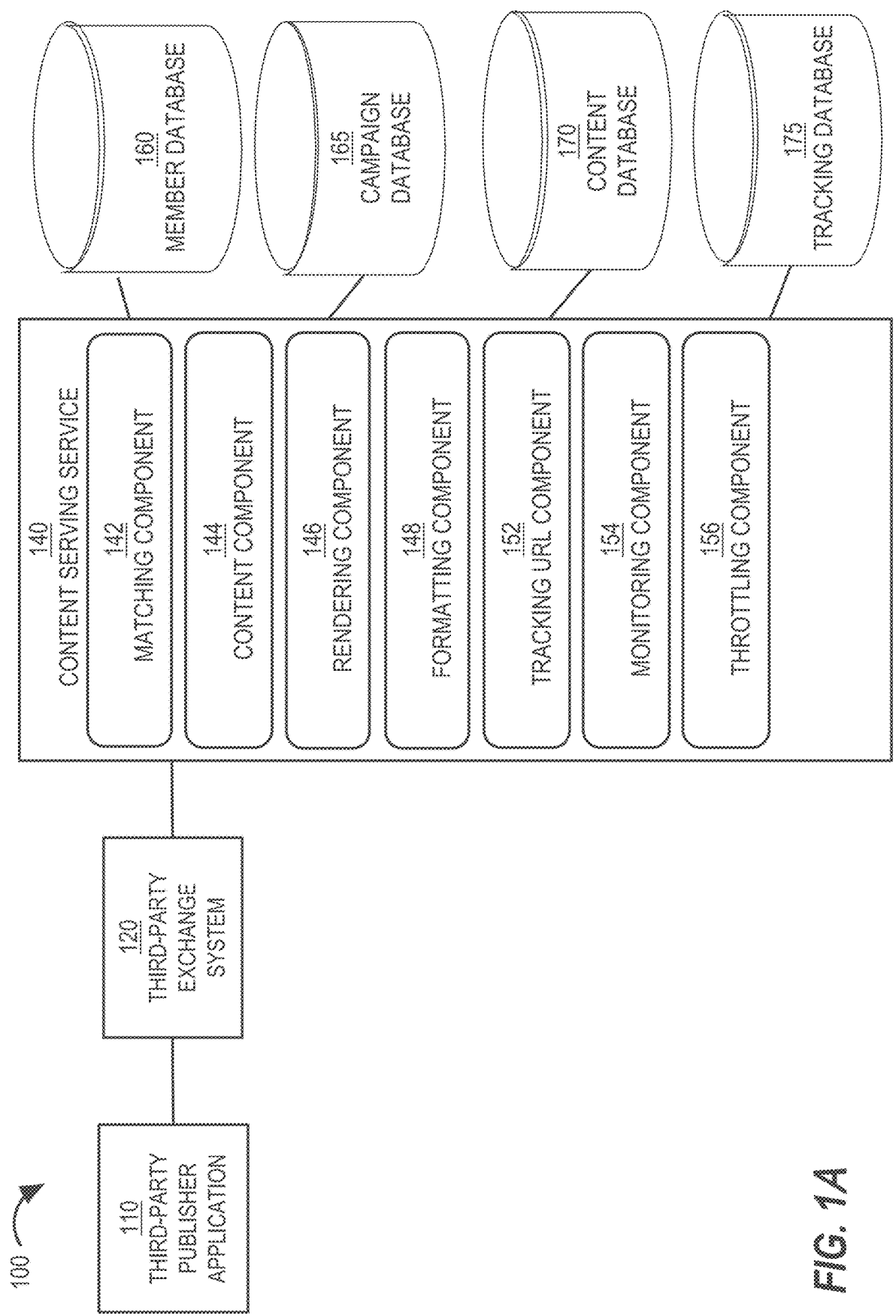
FIG. 1A is a block diagram that depicts an example serving pipeline for serving HTML content associated with a campaign, in an embodiment.

FIG. 1A is a block diagram that depicts an example serving pipeline for serving HTML content associated with a campaign, in an embodiment. Serving pipeline 100 includes a third-party publisher application 110, a third-party exchange system 120, a content serving service 140, a member database 160, a campaign database 165, a content database 170, and a tracking database 175.

Content serving service 140 receives content requests initiated by a third-party publisher application 110 executing on a computing device (not depicted) from third-party exchange system 120. A user operating the computing device interacts with third-party publisher application 110 (e.g., CNN) to initiate a content request. The third-party publisher application 110 sends the content request to third-party exchange system 120. In response, third-party exchange system 120 transmits a content request to content serving service 140. The content request from third-party exchange 110 includes a publisher identifier that uniquely identifies the third-party publisher application and a mobile identifier (MAID) that uniquely identifies a user or user account associated with the computing device, a device ID (e.g., a MAC address) that uniquely identifies the computing device on which the third-party publisher application is executing, an IP address, and/or a GPS location.

Content Serving Service

Content serving service 140 performs one or more operations on the content request, such as identifying a member and an associated campaign, retrieving a template and content that is specific to the campaign, formatting the content and rendering HTML content, tracking and monitoring the rendered HTML content, or throttling the traffic based on the requests.

In one embodiment, content serving service 140 includes a matching component 142, a content component 144, a rendering component 146, a formatting component 148, a tracking component 152, a monitoring component 154, and a throttling component 156. Other embodiments may include more or less than these components.

Content serving service 140 determines whether the content request is associated with a user that is a member of a particular online service, such as a social network service, that might be affiliated with a content delivery system (e.g., LinkedIn). Such a member determination may be performed by using a mobile identifier (e.g., MAID) included in the content request to determine whether the mobile identifier matches with a member ID that is stored in a member database 160. In other embodiments, other types of identifiers that are included in the request can be used to make a member determination.

Member database 160 stores a set of member identifiers that is associated with a respective member of the content delivery system. Content serving service 140 accesses the member database 160 to make a determination of whether a user who initiated the content request is a member of the particular online service. If the mobile identifier is associated with a member identifier, then the user is a member of the particular online service and the content serving service 140 identifies one or more campaigns that are associated with the matched member identifier.

Matching component 142 identifies one or more campaigns that are associated with the determined member identifier. The matching component 142 accesses the campaign database 165 to retrieve the campaign information for the determined member ID. The campaign database 165 includes a set of campaigns and associated information, such as a date, time, objective, message, and/or related content. One or more campaigns can be associated with a single member and the associated campaigns can be ranked based on one or more criteria.

Content component 144 determines content for the campaign by retrieving the content from content database 170. The content includes image-based content (such as an image or video) and/or text-based content (such as a title, description, and/or link). Each campaign may be associated with respective content that can be different from one another. The content is received from a third-party content provider and stored in the content database 170.

Rendering component 146 generates the requested content using the content from content database 170. In one embodiment, the requested content can be HTML content that includes content that is specific to the campaign. The HTML content can be Cascading Style Sheet (CSS) content that has a specific logic for formatting and displaying the content. The HTML content can be generated for a full screen of the computing device (e.g., interstitial). Such HTML content is considered "interstitial content" since the HTML content is displayed before or after expected content. Alternatively, the HTML content can be generated for a partial screen of the computing device (e.g., a banner). In some embodiments, the banner HTML content can be converted to interstitial HTML content. In a related embodiment, HTML content can be audiovisual content (e.g., video). Both interstitial and banner types of HTML content can be presented in a video format.

Rendering component 146 generates the requested content based on a template that provides a predefined format for content. For example, the template may include one or more assigned slots for each content such as title, label, description, or image. The one or more assigned slots can be plug-in sections and the associated content can be plugged into the corresponding slot (e.g., an image is plugged into an image slot in the template and a title is plugged into a title slot in the template). Formatting of the one or more assigned slots can be predefined based on the template that is associated with one or more formatting parameters. Example templates include a logic-less template. One way of generating the logic-less template is using the HANDLEBAR templating language.

In some embodiments, a template may include one or more links for content. For example, a CSS template may include a link for an image. Instead of plugging-in actual content into the corresponding slot, the CSS template may include a corresponding link for each content (e.g., an image tag).

Formatting component 148 can include formatting parameters for the template such as a ratio, size, font, location or style. The formatting parameters adhere to the policies of content serving service 140. In one embodiment, formatting parameters can be uniform and generic for all campaigns (e.g., the template is uniform, and one CSS file is needed for all campaigns). Alternatively, formatting parameters can be specific to each campaign, and thus, one or more CSS files with differing logics for formatting parameters can exist for different campaigns.

The formatting parameter can specify certain rules defining where each slot is located in relation to another content slot. For example, the rules can define that the image slot is located adjacent to the description slot and the title slot is located above the description slot. The formatting parameter can specify other rules such as the aspect ratio of the slots. For example, the aspect ratio of the logo can be one by one. Thus, even though the phone screen size changes, the aspect ratio of the logo will remain the same (one by one). Any variation of the formatting parameters is possible based on the configuration of the template and the formatting parameter rules are not to be construed to be limited to the above examples.

In some embodiments, generating the HTML content can be based on the orientation of the device. For example, in a landscape mode, the aspect ratio of a label can be one by one. Alternatively, in a portrait mode, the aspect ratio for the logo can be 1.91 by 1. The HTML content can be rendered on the client device in a manner that automatically adjusts and fits into the screen of the client computing device, regardless of the device type.

The pre-filled template with respective content filled into the slots of the HTML content can be stored in a cache. The pre-filled template can be used later when a request for the HTML content is received. As the pre-filled HTML content is stored in the cache and ready to be sent to the client device, the request for HTML content can be handled immediately when the request is received without causing any delay.

On the other hand, if a pre-filled cache is not readily available at the time of the receipt of the request, then content serving service 140 generates HTML content of the campaigns that are determined to match with the member ID for future use. The pre-filled cache is generally available for a couple of hours unless the content changes. Thus, by generating the HTML content before a future request is received, the HTML content is prepared to be sent to the third-party publisher application 110 immediately when the request comes in. By doing so, content serving service 140 does not lose an opportunity to serve the requested content at the requested time.

Tracking URL component 152 generates a click tracking URL. The click tracking URL can include macros that are populated at serving time with real values. For example, the macros can include an identifier of the third-party application, identifier associated with the content serving service, encrypted mobile identifier, request identifier, the format of content, landing page address, or campaign identifier. Other macros that are relevant to the population of the URL can be used to generate the click tracking URL.

In one embodiment, a click tracking URL includes an address of a destination page. The click tracking URL can change when the request is received. The click tracking URL can be a dynamic aspect of generating the requested content because the click tracking URL is updated per request. Because the click tracking URL is dynamically changed, the URL is not stored in the cache with the pre-filled template. When the template is ready to be sent to the third-party publisher application 110, the click tracking URL can be embedded in the HTML content and sent to the third-party publisher application 110.

In one embodiment, tracking URL component 152 generates an impression tracking URL. The impression tracking URL tracks whether a user has viewed the HTML content. In a related embodiment, tracking URL component 152 generates a win notification URL. The win notification URL is generated when a content item selection event is triggered, and a content item is selected from the event.

Upon receiving a content request and determining that HTML content of a content delivery campaign (pre-filled) is stored in the cache, the tracking URL is generated, and the HTML content and the tracking URL are sent from content serving service 140 to third-party exchange system 120. In some embodiments, the impression tracking URL and the win notification URL are sent from content serving service 140 to third-party exchange system 120 with the click tracking URL.

Monitoring component 154 can monitor and track the user interaction with the displayed HTML content on the client computing device. Non-limiting example statistics of user interactions with respect to the HTML content can include win count (or number of times the HTML content "won" a content item selection event triggered by third-party exchange system 120), impression count (or number of times the HTML content item was displayed on a computing device, which number may be less than the win count since the HMTL content might not be ultimately selected by third-party exchange system 120), click count (or number of times users have selected the HTML content), click-through rate (CTR) (e.g., click count/impression count), impression rate (e.g., impression count/win count). The user interaction statistics are stored in tracking database 175. Tracking database 175 can store user interaction statistics for each campaign, user, device, format, template, or formatting parameters.

Based on the user interaction statistics, the formatting parameters can be updated to increase the CTR or click count. If CTR of HTML content which was generated based on a particular template or formatting parameters was higher for certain users (e.g., female users) than other types of users (e.g., male users), then the template or formatting parameters can be changed for the users who are associated with low user interaction performance metrics (e.g., showing larger sized images of a content item generated using the certain formatting parameter).

Based on the user interaction statistics stored in tracking database 175, an unusual user behavior activity pattern can be detected. An alert can be generated in response to detecting the unusual user behavior activity pattern. For example, monitoring component 154 can perform a fraud check to determine any fraudulent third-party publisher application or any fraudulent activities that is associated with the displayed HTML content. If any fraudulent activity is detected, such as a sudden drop in CTR or click count, then an alert can be generated to indicate that the third-party publisher application (e.g., a dating app) needs to be monitored and the identifier of the third-party publisher application can be listed in a list of known fraudulent application list.

In some embodiments, throttling component 156 can use a format-based throttler to control an admittance of the requests. In a case where multiple requests are received at the content serving service 140, the content serving service may determine that an amount of traffic that is received at the content serving service 140 exceeds a threshold value. When content serving service 140 determines that it cannot generate all the requested content at content serving service 140, content serving service 140 can control the admittance of the requests using the format-based throttler to efficiently handle the requests. For example, if content serving service 140 can process one thousand requests per second (seven hundred for a native type and three hundred for a banner type), and receives four hundred requests for the banner type, then content serving service 140 can process only three hundred requests for the banner type.

In a related embodiment, content serving service 140 can use a third-party exchange system-based throttler to control an admittance of the requests. In a case where multiple requests are received at the content serving service 140, the content serving service determines that an amount of traffic that is received at the content serving service 140 exceeds a threshold value for each third-party exchange system type. For example, if content serving service 140 can process one thousand requests per second for a "A" type of third-party exchange system and seven hundred requests per second for a "B" type of third-party exchange system, and receive eight hundred requests for the "B" type of third-party exchange system, then content serving service 140 can process only seven hundred requests for the "B" type of third-party exchange system. It is contemplated that the throttling processes (format-type process or third-party exchange system-type process) may be performed in any order.

Figure 1B:
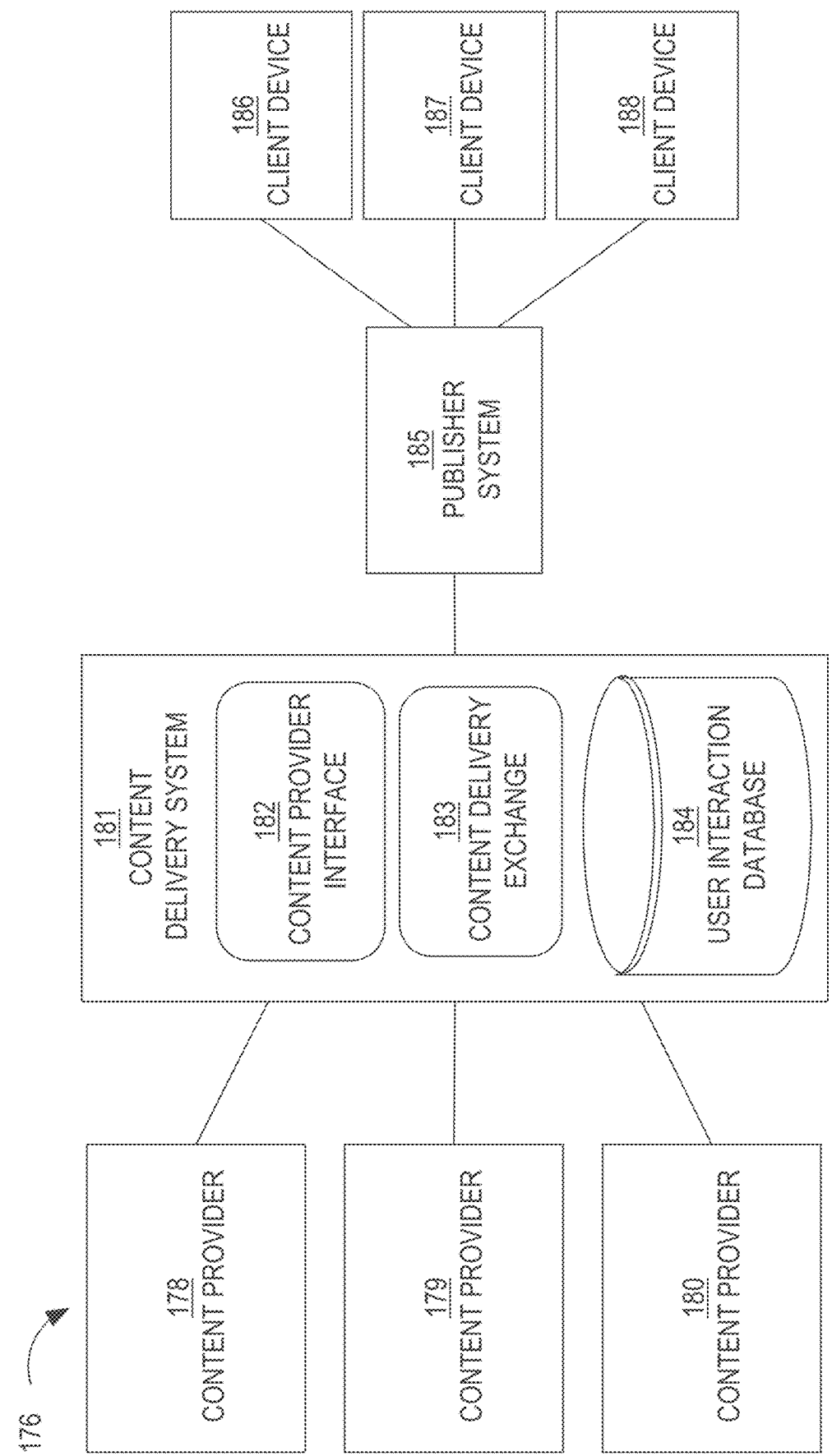
FIG. 1B is a block diagram that depicts a system for distributing content items to one or more end-users, in an embodiment.

FIG. 1B is a block diagram that depicts a system 176 for distributing content items to one or more end-users, in an embodiment. System 176 includes content providers 178-180, a content delivery system 181, a publisher system 185, and client devices 186-188. Although three content providers are depicted, system 176 may include more or less content providers. Similarly, system 176 may include more than one publisher and more or less client devices.

Content providers 178-180 interact with content delivery system 181 (e.g., over a network, such as a LAN, WAN, or the Internet) to enable content items to be presented, through publisher system 185, to end-users operating client devices 186-188. Thus, content providers 178-180 provide content items to content delivery system 181, which in turn selects content items to provide to publisher system 185 for presentation to users of client devices 186-188. However, at the time that content provider 178 registers with content delivery system 181, neither party may know which end-users or client devices will receive content items from content provider 178.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 181.

Although depicted in a single element, content delivery system 181 may comprise multiple computing elements and devices, connected in a local network or distributed regionally or globally across many networks, such as the Internet. Thus, content delivery system 181 may comprise multiple computing elements, including file servers and database systems. For example, content delivery system 181 includes (1) a content provider interface 182 that allows content providers 178-180 to create and manage their respective content delivery campaigns and (2) a content delivery exchange 183 that conducts content item selection events in response to content requests from a third-party content delivery exchange and/or from publisher systems, such as publisher system 185.

Publisher system 185 provides its own content to client devices 186-188 in response to requests initiated by users of client devices 186-188. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application (e.g., a native mobile application) that is configured to only communicate with publisher system 185 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 185 provides the requested content (e.g., a web page) to the client device.

Simultaneously or immediately before or after the requested content is sent to a client device, a content request is sent to content delivery system 181 (or, more specifically, to content delivery exchange 183). That request is sent (over a network, such as a LAN, WAN, or the Internet) by publisher system 185 or by the client device that requested the original content from publisher system 185. For example, a web page that the client device renders includes one or more calls (or HTTP requests) to content delivery exchange 183 for one or more content items. In response, content delivery exchange 183 provides (over a network, such as a LAN, WAN, or the Internet) one or more particular content items to the client device directly or through publisher system 185. In this way, the one or more particular content items may be presented (e.g., displayed) concurrently with the content requested by the client device from publisher system 185.

In response to receiving a content request, content delivery exchange 183 initiates a content item selection event that involves selecting one or more content items (from among multiple content items) to present to the client device that initiated the content request. An example of a content item selection event is an auction.

Content delivery system 181 and publisher system 185 may be owned and operated by the same entity or party. Alternatively, content delivery system 181 and publisher system 185 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 186-188 include desktop computers, laptop computers, tablet computers, wearable devices, video game consoles, and smartphones.

Bidders

In a related embodiment, system 176 also includes one or more bidders (not depicted). A bidder is a party that is different than a content provider, that interacts with content delivery exchange 183, and that bids for space (on one or more publisher systems, such as publisher system 185) to present content items on behalf of multiple content providers. Thus, a bidder is another source of content items that content delivery exchange 183 may select for presentation through publisher system 185. Thus, a bidder acts as a content provider to content delivery exchange 183 or publisher system 185. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 176 includes one or more bidders but no content providers. However, embodiments described herein are applicable to any of the above-described system arrangements.

Content Delivery Campaigns

Each content provider establishes a content delivery campaign with content delivery system 181 through, for example, content provider interface 182. An example of content provider interface 182 is Campaign Manager™ provided by LinkedIn. Content provider interface 182 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 186-188. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 183 receives, from a computing device, a request that does not satisfy the targeting criteria, then content delivery exchange 183 ensures that any content items associated with the particular content delivery campaign are not sent to the computing device.

Thus, content delivery exchange 183 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 183 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 185 may not satisfy targeting criteria of one content item of a campaign, the same content request may satisfy targeting criteria of another content item of the campaign.

Different content delivery campaigns that content delivery system 181 manages may have different charge models. For example, content delivery system 181 (or, rather, the entity that operates content delivery system 181) may charge a content provider of one content delivery campaign for each presentation of a content item from the content delivery campaign (referred to herein as cost per impression or CPM). Content delivery system 181 may charge a content provider of another content delivery campaign for each time a user interacts with a content item from the content delivery campaign, such as selecting or clicking on the content item (referred to herein as cost per click or CPC). Content delivery system 181 may charge a content provider of another content delivery campaign for each time a user performs a particular action, such as purchasing a product or service, downloading a software application, or filling out a form (referred to herein as cost per action or CPA). Content delivery system 181 may manage only campaigns that are of the same type of charging model or may manage campaigns that are of any combination of the three types of charging models.

A content delivery campaign may be associated with a resource budget that indicates how much the corresponding content provider is willing to be charged by content delivery system 181, such as $176 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 183 receives triggers a content item selection event.

For example, in response to receiving a content request, content delivery exchange 183 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 183 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 181) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 183 conducts one or more content item selection events. Thus, content delivery exchange 183 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 181 conducts one or more content item selection events. In this latter embodiment, content delivery system 181 sends one or more content items to the other exchange, which selects one or more content items from among multiple content items that the other exchange receives from multiple sources. In this embodiment, content delivery exchange 183 does not necessarily know (a) which content item was selected if the selected content item was from a different source than content delivery system 181 or (b) the bid prices of each content item that was part of the content item selection event. Thus, the other exchange may provide, to content delivery system 181, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 181 may log one or more types of events, with respect to content item summaries, across client devices 152-156 (and other client devices not depicted). For example, content delivery system 181 determines whether a content item summary that content delivery exchange 183 delivers is presented at (e.g., displayed by or played back at) a client device. Such an "event" is referred to as an "impression." As another example, content delivery system 181 determines whether a content item summary that exchange 183 delivers is selected by a user of a client device. Such a "user interaction" is referred to as a "click." Content delivery system 181 stores such data as user interaction data, such as an impression data set and/or a click data set. Thus, content delivery system 181 may include a user interaction database 184. Logging such events allows content delivery system 181 to track how well different content items and/or campaigns perform.

For example, content delivery system 181 receives impression data items, each of which is associated with a different instance of an impression and a particular content item summary. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 181 manages delivery of multiple content items, then different impression data items may be associated with different content items. One or more of these individual data items may be encrypted to protect privacy of the end-user. The impression data items are logged and tracked based on one or more protection policies.

Similarly, a click data item may indicate a particular content item summary, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item summary, content delivery system 181 may calculate a CTR for the content item summary.

Process Overview

Figure 2A:
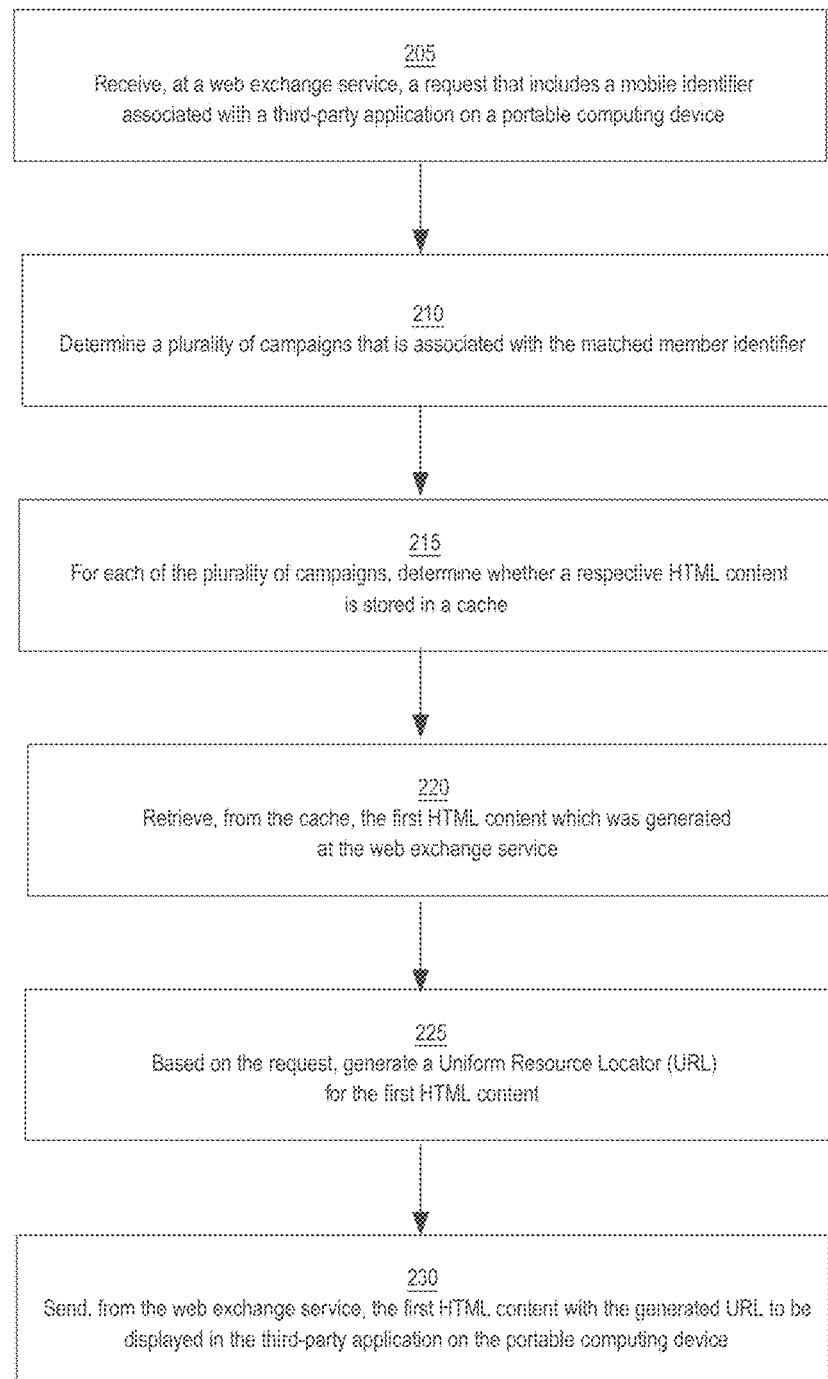
FIG. 2A and FIG. 2B are flow diagrams that depicts a process for generating HTML content at content serving service, in an embodiment.
Figure 2B:
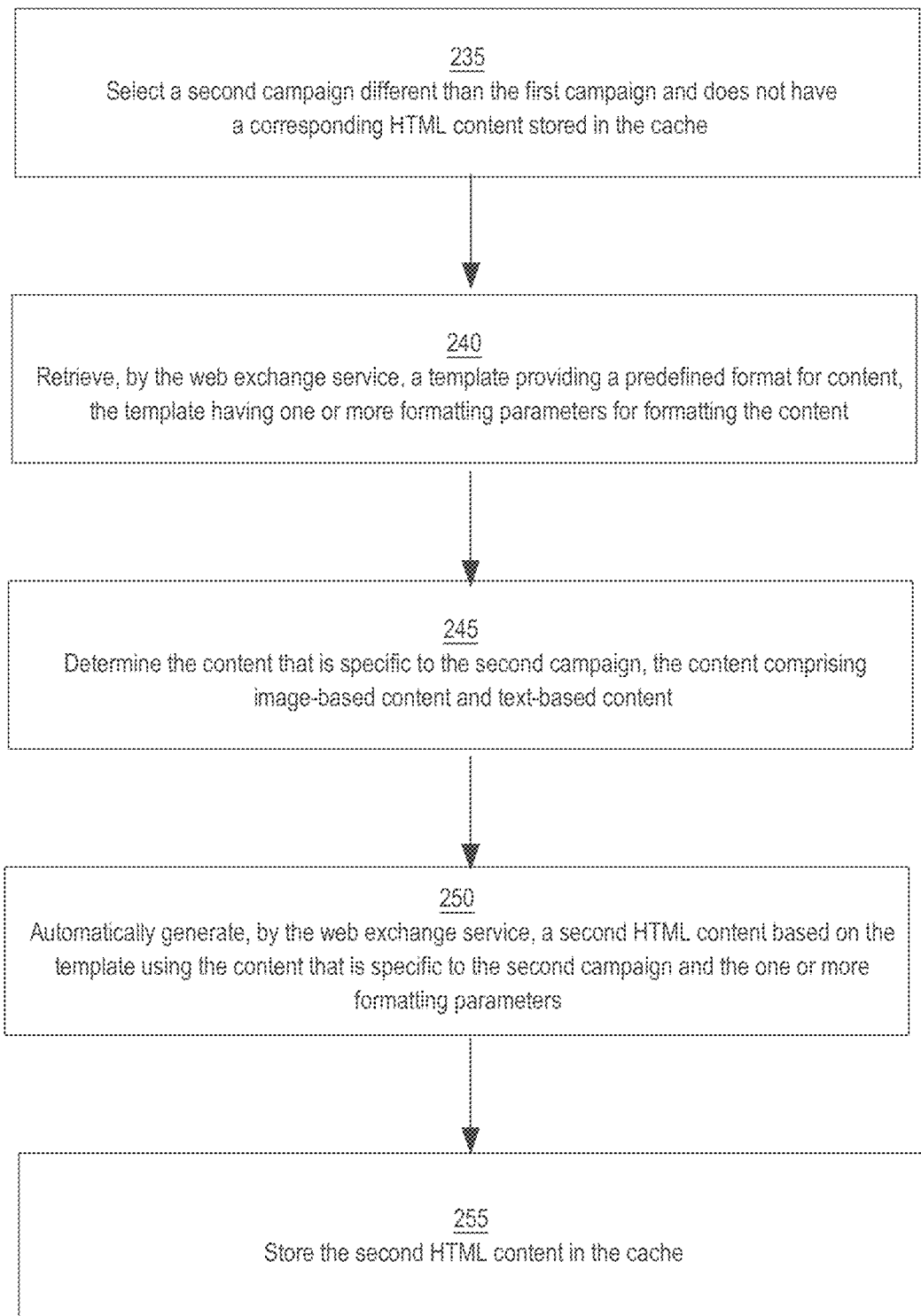

FIGS. 2A-2B are flow diagrams that depict a process 200 for rendering HTML content, in an embodiment. Process 200 may be implemented by content serving service 140.

At block 205, content serving service 140 receives a content request from third-party exchange system 120. The content request is triggered by an initial content request from a third-party publisher application 110 that executes on a client device (e.g., a portable computing device) and transmits the initial content request over a computer network to third-party exchange system 120. Third-party exchange system 120 may send the content request to content serving service 140. The content request may be a Hypertext Transfer Protocol (HTTP) request that includes information about the content request, such as an identifier of the third-party publisher application, an encrypted mobile identifier, a request identifier, a type of connection, and/or an IP address of the client device.

At block 210, content serving service 140 determines whether a user associated with the client device is a member of an online service (such as a social networking service) by comparing the mobile ID with a set of known mobile identifiers stored in member database 160. Block 210 may involve identifying a mobile ID in the content request and, using a mobile ID to member ID mapping, determine whether the mobile ID is associated with a member ID stored in a member database 160. Upon determining that the particular ID is associated with the member ID, content serving service 140 accesses campaign database 165 to identify one or more campaigns that are associated with the matched member ID. Campaign database 165 includes a mapping of member IDs to campaign IDs and related campaign information that is necessary to generate the requested content.

At block 215, for each of one or more campaigns that is identified as being associated with the member ID, content serving service 140 determines if respective content (HTML content) is stored in a cache by reading the data blocks in the cache. For example, if three campaigns are identified as being associated with the member ID, content serving service 140 checks, for each of the three campaigns, to see if corresponding HTML content is stored in the cache. If only one of the three campaigns (e.g., first) has corresponding HTML content (e.g., first HTML content) stored in the cache, then the first campaign is selected to be sent to the third-party publisher application 110.

At block 220, for the selected campaign, the corresponding HTML content is retrieved from the cache. The corresponding HTML content was generated at content serving service 140 before the request was received. Because serving the request needs to be performed in a certain amount of timeframe (e.g., 130 milliseconds), the HTML content needs to be prepared before the request is received if content serving service 140 wants to serve the requested content in the allotted time. Thus, if a first request is received and the requested content is not stored in the cache, then content serving service 140 loses its first opportunity to serve the requested content.

In some embodiments, HTML content includes one or more of static and dynamic parts. The static part of the HTML content is the content that does not change such as title, description, or image. An example dynamic part of the HTML content is a URL that changes when the request is received. Thus, every time the request is received, the URL is generated to reflect the real-time values. At block 225, a click tracking URL is generated as the request is received at content serving service 140. The URL may include information such as an identifier of the third-party publisher application, identifier associated with the content serving service, an encrypted mobile identifier, a request identifier, the format of content, landing page address, campaign identifier, a type of connection, or IP address of the client device.

At block 230, the first HTML content and the URL are sent from content serving service 140 to third-party exchange system 120, which may perform its own content item selection event. If third-party exchange system 120 selects the first HTML content, then third-party exchange system 120 sends the first HTML content to third-party publisher application 110 to be rendered on the client computing device.

In some embodiments, the HTML content is available temporarily (a couple of hours) in the cache and the HTML content is configured to be updated when the content (description) is changed. Thus, after the first request, content serving service 140 pre-fills the cache for the identified campaigns (e.g., second or third campaign that does not have stored HTML content in the cache) to handle the future requests on time.

At block 235, content serving service 140 selects a second campaign from among the identified plurality of campaigns. The second campaign does not have corresponding HTML content stored in the cache. In one embodiment, the second campaign can be ranked based on ranking criteria (e.g., bid amount, predicted click-through rate, etc.) and selected.

At block 240, a template is retrieved from content serving service 140. The template provides a predefined format for content. The template has its predetermined format and has one or more slots for content. The template includes one or more formatting parameters for formatting the content such as a ratio, font, size, location, or a style. The formatting parameters can be uniform for all campaigns. Alternatively, the formatting parameters can differ based on the type of campaign, campaign, content provider, and/or industry.

At block 245, content serving service 140 accesses content database 170 to retrieve content that is specific to the campaign. The content (such as title, image, description, landing page) is different for each campaign. The retrieved content can be plugged into the assigned predefined slots in the template. The content is provided by the content provider and stored in the content database 170.

At block 250, content serving service 140 automatically generates second HTML content for the second campaign, based on the template, using the content that is specific to the campaign. The second HTML content is different from the first HTML content in that the content for the second HTML content is specific to the second campaign that is different from the content for the first campaign. The second HTML content is adjusted to fit into the height and width of the screen even when the orientation of the client device changes.

At block 255, the second HTML content is stored in the cache in anticipation for any future request. When a second request is received for the second HTML content, a tracking URL for the second campaign is generated, and embedded with the second HTML content to be sent to the third-party exchange system 120.

After HTML content is shown, content serving service 140 tracks the user activity with the HTML content. The tracking information includes click-through rate (CTR), impression rate, bounce rate, or average staying time of HTML content. The tracking information is sent to monitoring component 154 of content serving service 140 and stored in the tracking database 175. This tracking information is used to predict future interaction with the HTML content to determine what kind of interactions will be made with respect to the HTML content. The tracking information can be helpful to calculate the Return of Investment (ROI).

Example Computer-Generated Graphical User Interface

Figure 3A:
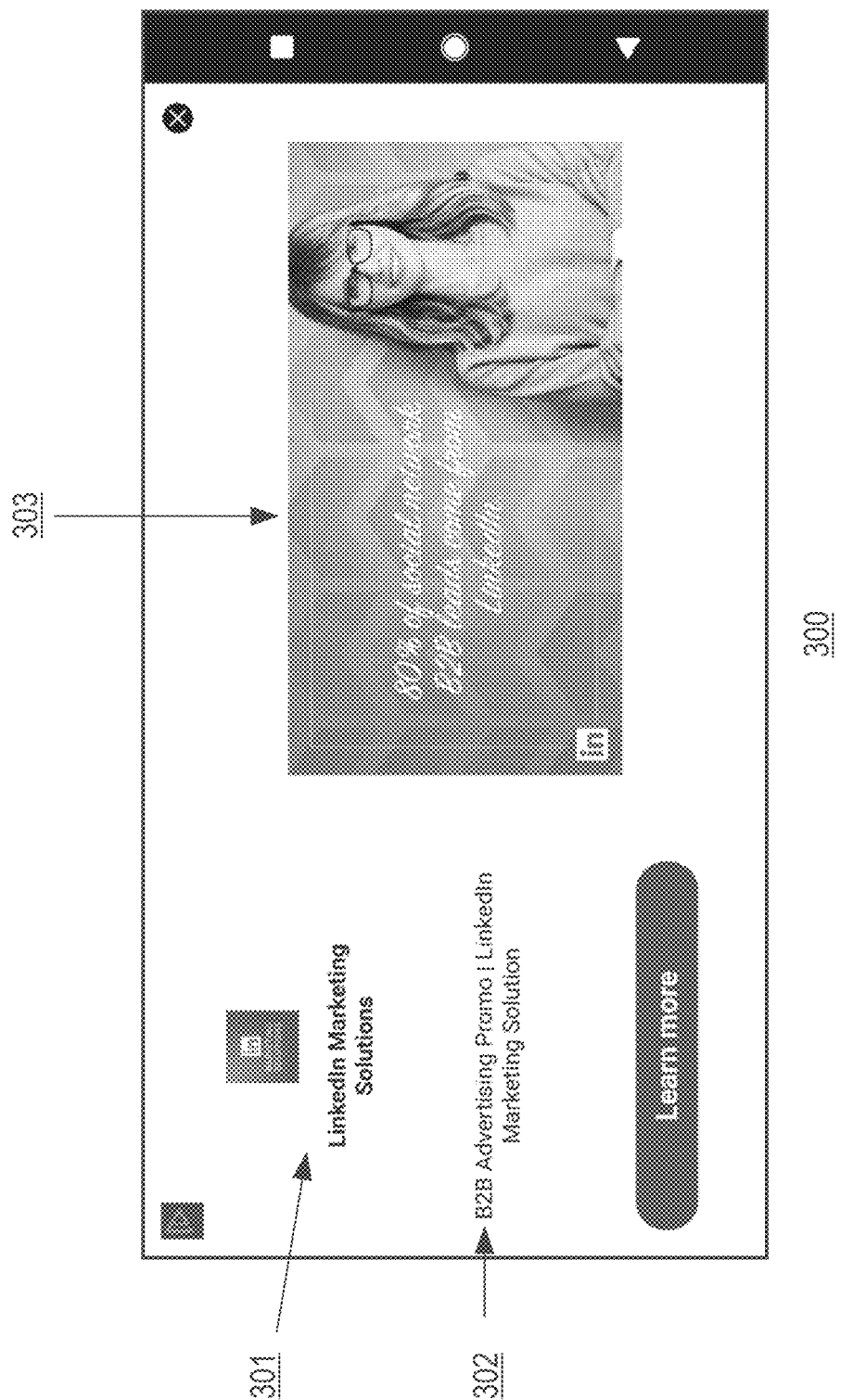
FIGS. 3A and 3B are example user interfaces for presenting HTML content at a portrait mode and a landscape mode, respectively, in an embodiment.
Figure 3B:

As shown in FIGS. 3A-3B, rendering the HTML content can be adjusted based on the orientation of the mobile device. For example, as shown in FIG. 3A, if the mobile device is in a landscape mode 300, the HTML content is adjusted to fit the mobile device in the landscape mode 300. Alternatively, as shown in FIG. 3B, if the mobile device is in a portrait mode 305, the HTML content is adjusted to fit the mobile device in the portrait mode 305. The HTML content can be fit into the screen of the mobile device and automatically adjusts the height and width of the HTML content based on the screen size of the device. In some embodiments, if the space of the screen is too small for a particular orientation mode, then truncation of the HTML content occurs.

A template for HTML content can include slots for a title 301, a description 302, and an image 303. In one example, in the landscape mode 300, the title slot 301 is placed above the description slot 302 and the image 303 is placed in the right-hand side of the screen. When the device is rotated to the portrait mode 305, the image slot 303 is inserted between the title slot 301 and the description slot 302 for better readability of the content.

In some embodiments, the ratio of the content may remain the same regardless of the device type or the size of the screen. For example, in a portrait mode, the ratio of the image can be 1.91 by 1. The ratio of the image may remain the same even though the user increases or shrinks the HTML content that is displayed on the mobile device. Certain formats including the ratios are fixed at a certain rate to maintain the quality of the content (image) that is rendered on the screen.

In some embodiments, each of the title 301, description 302, image 303 includes a link to a web page of the content provider, allowing the user to navigate to the content provider's web page upon clicking the content in the HTML content.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
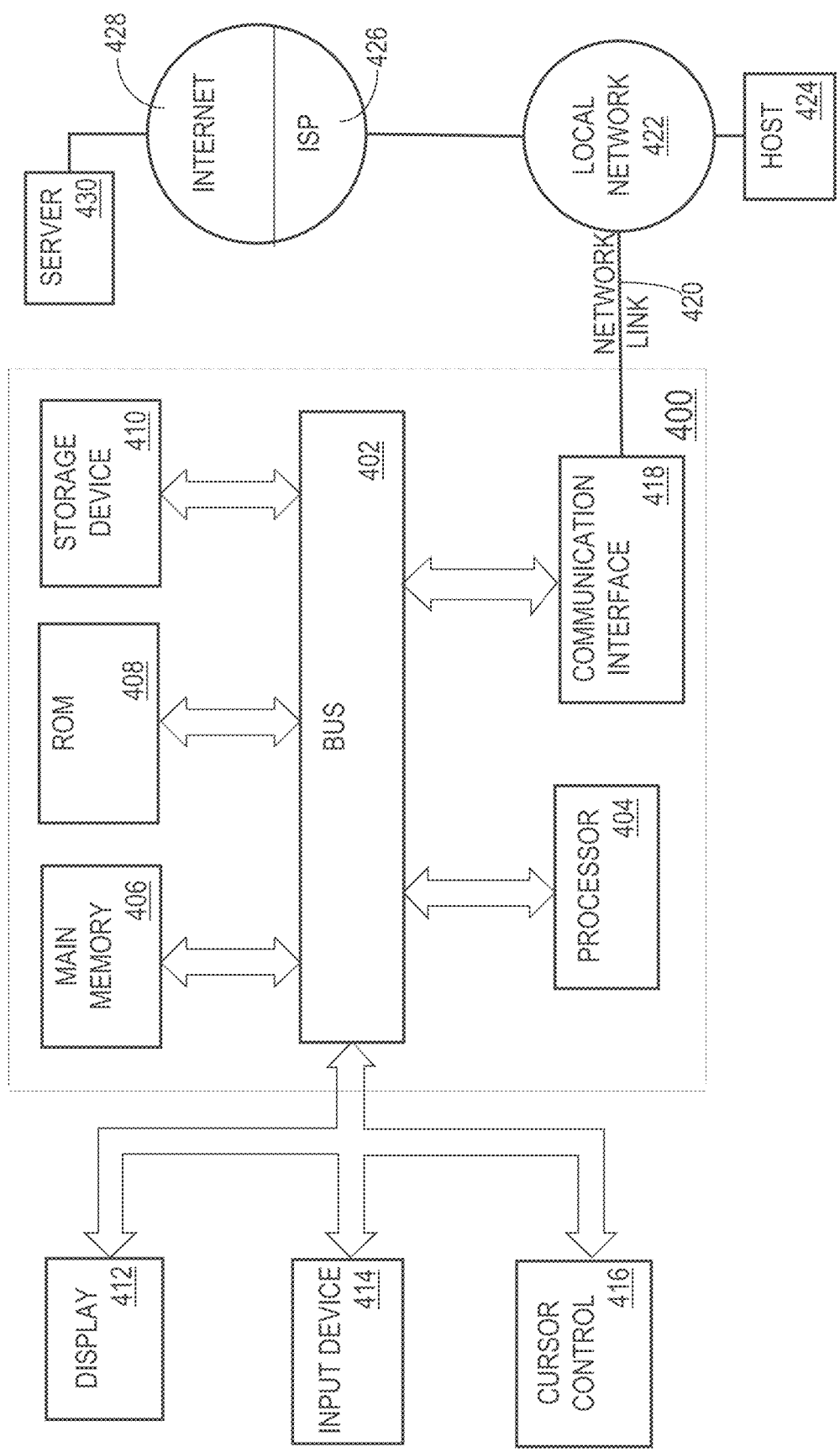
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

A cache is included as part of the main memory 406/ storage components. The cache may be implemented using any conventional, sufficiently fast technology, such as by using one or more flash memory devices, random access memory, a portion of main memory, etc. The cache may be implemented as a Solid-State Disk (SSD) or a as a module on the server. Cache memory is read and written to store the HTML content generated at content serving service 140.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving, at a web exchange service, a request that includes a mobile identifier associated with a third-party application on a portable computing device;
   upon determining that the mobile identifier matches with one of a set of member identifiers stored in a member database, determining a plurality of campaigns that is associated with the matched member identifier;
   for each of the plurality of campaigns, determining whether a respective Hypertext Markup Language (HTML) content is stored in a cache;
   upon determining that a first campaign of the plurality of campaigns has a first HTML content stored in the cache, retrieving, from the cache, the first HTML content which was generated at the web exchange service;
   based on the request, generating a Uniform Resource Locator (URL) for the first HTML content;
   sending, from the web exchange service, the first HTML content with the generated URL to be displayed in the third-party application on the portable computing device;
   selecting, from among the plurality of campaigns, a second campaign that is different than the first campaign and that does not have a corresponding HTML content stored in the cache;
   for the second campaign:
      retrieving, by the web exchange service, a template providing a predefined format for content, the template having one or more formatting parameters for formatting the content;
      determining the content that is specific to the second campaign, the content comprising image-based content and text-based content;
      automatically generating, by the web exchange service, a second HTML content based on the template using the content that is specific to the second campaign and the one or more formatting parameters;
      storing the second HTML content in the cache.

2. The computer-implemented method of claim 1, further comprising:
   determining whether the request is to generate the first HTML content in a full screen or a partial screen of the portable computing device.

3. The computer-implemented method of claim 1, wherein the first HTML content comprises Cascading Style Sheet (CSS) content and wherein the generated URL for the first HTML content is a trackable URL that is updated when the request is received.

4. The computer-implemented method of claim 1, further comprising:
determining an orientation of the portable computing device;
wherein displaying the first HTML content is based on the determined orientation of the portable computing device, and wherein the one or more formatting parameters for a landscape mode is different from the one or more formatting parameters for a portrait mode.

5. The computer-implemented method of claim 1, further comprising:
determining an amount of traffic based on a number of requests received at the web exchange service;
upon determining that the amount of traffic exceeds a threshold value, controlling, by a throttle at the web exchange service, an admittance of the requests.

6. The computer-implemented method of claim 1, further comprising, after the first HTML content is displayed on the portable computing device:
receiving user interaction data associated with the first HTML content which is formatted using the one or more formatting parameters, the user interaction data comprising a click-through rate (CTR).

7. The computer-implemented method of claim 6, further comprising:
based on the user interaction data, detecting an unusual user behavior activity pattern with the first HTML content rendered on the portable computing device;
sending an alert in response to detecting the unusual user behavior activity pattern.

8. The computer-implemented method of claim 1, wherein the first HTML content includes audiovisual content.

9. The computer-implemented method of claim 1, wherein the one or more formatting parameters comprise at least one of a ratio, size, font, location, or style.

10. A computer-implemented method comprising:
identifying, by a web exchange service, a template providing a predefined format for content, the template having one or more formatting parameters for formatting the content;
determining the content that is specific to a particular campaign, the content comprising image-based content and text-based content;
automatically generating, by the web exchange service, hypertext markup language (HTML) content based on the template using the content that is specific to the particular campaign and the one or more formatting parameters for formatting the content;
storing the HTML content in a cache;
receiving a request for the HTML content from a third-party application on a portable computing device;
in response to receiving the request, determining that the HTML content is stored in the cache;
retrieving, from the cache, the stored HTML content;
generating a URL based on the request;
sending the HTML content with the URL to be displayed in the third-party application on the portable computing device.

11. One or more non-transitory computer-readable storage media storing instructions that, when executed by one or more processors, perform a method comprising:

receiving, at a web exchange service, a request that includes a mobile identifier associated with a third-party application on a portable computing device;
upon determining that the mobile identifier matches with one of a set of member identifiers stored in a member database, determining a plurality of campaigns that is associated with the matched member identifier;
for each of the plurality of campaigns, determining whether a respective Hypertext Markup Language (HTML) content is stored in a cache;
upon determining that a first campaign of the plurality of campaigns has a first HTML content stored in the cache, retrieving, from the cache, the first HTML content which was generated at the web exchange service;
based on the request, generating a Uniform Resource Locator (URL) for the first HTML content;
sending, from the web exchange service, the first HTML content with the generated URL to be displayed in the third-party application on the portable computing device;
selecting, from among the plurality of campaigns, a second campaign that is different than the first campaign and that does not have a corresponding HTML content stored in the cache;
for the second campaign:
retrieving, by the web exchange service, a template providing a predefined format for content, the template having one or more formatting parameters for formatting the content;
determining the content that is specific to the second campaign, the content comprising image-based content and text-based content;
automatically generating, by the web exchange service, a second HTML content based on the template using the content that is specific to the second campaign and the one or more formatting parameters;
storing the second HTML content in the cache.

12. The one or more non-transitory computer-readable storage media of claim 11, when executed, the method further comprising:
determining whether the request is to generate the first HTML content in a full screen or a partial screen of the portable computing device.

13. The one or more non-transitory computer-readable storage media of claim 11, wherein the first HTML content comprises Cascading Style Sheet (CSS) content and wherein the generated URL for the first HTML content is a trackable URL that is updated when the request is received.

14. The one or more non-transitory computer-readable storage media of claim 11, when executed, the method further comprising:
determining an orientation of the portable computing device;
wherein displaying the first HTML content is based on the determined orientation of the portable computing device, and wherein the one or more formatting parameters for a landscape mode is different from the one or more formatting parameters for a portrait mode.

15. The one or more non-transitory computer-readable storage media of claim 11, when executed, the method further comprising:
determining an amount of traffic based on a number of requests received at the web exchange service;
upon determining that the amount of traffic exceeds a threshold value, controlling, by a throttle at the web exchange service, an admittance of the requests.

16. The one or more non-transitory computer-readable storage media of claim 11, when executed, the method further comprising, after the first HTML content is displayed on the portable computing device:
- receiving user interaction data associated with the first HTML content formatted using the one or more formatting parameters, the user interaction data comprising a click-through rate (CTR).

17. The one or more non-transitory computer-readable storage media of claim 16, when executed, the method further comprising:
- based on the user interaction data, detecting an unusual user behavior activity pattern with the first HTML content rendered on the portable computing device;
- sending an alert in response to detecting the unusual user behavior activity pattern.

18. The one or more non-transitory computer-readable storage media of claim 11, when executed, the method further comprising:
- based on the user interaction data, updating the one or more formatting parameters for the second HTML content.

19. The one or more non-transitory computer-readable storage media of claim 11, wherein the first HTML content includes audiovisual content.

20. The one or more non-transitory computer-readable storage media of claim 11, wherein the one or more formatting parameters comprise at least one of a ratio, size, font, location, or style.

* * * * *